US008671050B1

(12) United States Patent
Sandoval (10) Patent No.: US 8,671,050 B1
(45) Date of Patent: Mar. 11, 2014

(54) SYSTEMS AND METHODS FOR FUNDING AND BINDING AUTO LOANS (75) Inventor: Christopher A. Sandoval, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 359 days.

(21) Appl. No.: 11/904,242

(22) Filed: Sep. 25, 2007

(51) Int. Cl.
G06Q 40/00 (2012.01)
G06Q 40/02 (2012.01)
G06Q 30/02 (2012.01)
G06Q 30/06 (2012.01)

(52) U.S. Cl.
CPC ........... *G06Q 40/00* (2013.01); *G06Q 40/02* (2013.01); *G06Q 30/02* (2013.01); *G06Q 40/025* (2013.01); *G06Q 30/0207* (2013.01); *G06Q 30/06* (2013.01)
USPC .............................................. 705/38; 705/35

(58) Field of Classification Search
CPC ....... G06Q 40/00; G06Q 40/02; G06Q 30/02; G06Q 30/0207; G06Q 30/06
USPC ....................................................... 705/38, 35
See application file for complete search history.

(56) References Cited

U.S. PATENT DOCUMENTS

| | | | |
|---|---|---|---|
| 4,114,027 A | 9/1978 | Slater et al. ................... 235/419 |
| 4,736,294 A * | 4/1988 | Gill et al. ......................... 705/38 |
| 5,180,902 A | 1/1993 | Schick et al. | |
| 5,870,724 A | 2/1999 | Lawlor et al. ................... 705/42 |
| 5,884,283 A | 3/1999 | Manos ............................ 705/30 |
| 6,202,054 B1 | 3/2001 | Lawlor et al. ................... 705/42 |
| 6,708,086 B2 | 3/2004 | Richard | |
| 6,845,364 B1 | 1/2005 | Pool et al. | |
| 7,165,049 B2 | 1/2007 | Slater | |
| 2002/0019804 A1* | 2/2002 | Sutton ............................. 705/38 |
| 2002/0023051 A1* | 2/2002 | Kunzle et al. ................... 705/38 |
| 2002/0077969 A1 | 6/2002 | Walker et al. | |
| 2003/0028481 A1 | 2/2003 | Flitcroft et al. | |
| 2003/0139967 A1 | 7/2003 | Carleton | |
| 2004/0230536 A1 | 11/2004 | Fung et al. | |
| 2005/0182720 A1 | 8/2005 | Willard et al. | |
| 2005/0222904 A1* | 10/2005 | Cotten et al. .................... 705/14 |

(Continued)

OTHER PUBLICATIONS

Information pertaining to Chapnick, Nate. "Top 10 Automotive Credit Cards" was archived Dec. 15, 2006 at http://web.archive.org/web/20061215100733/http://www.edmunds.com/reviews/list/top10/117141/article.html by way of www.archive.org retrieved Jan. 6, 2009.*

(Continued)

Primary Examiner — Kito R Robinson
(74) Attorney, Agent, or Firm — Edwards Wildman Palmer LLP (57) ABSTRACT A way to facilitate the use of funds from an automobile loan is provided. The vehicle identification number of the automobile the loan applicant wishes to purchase is used to activate the funds of the loan for use. The applicant may receive a loan card to be used in the transaction that may be initially inactive, i.e. unable to be used for a transaction, until the vehicle identification number is received by the financial institution that accepted the loan application. An applicant of the loan may also be provided information relating to an account established for the disbursement of the loan proceeds. The account may be initially inactive until the vehicle identification number of the automobile is received and the applicant may also receive additional information required to be transmitted to the financial institution in order to use the funds, including, without limitation, a security code.

12 Claims, 9 Drawing Sheets

(56) References Cited

U.S. PATENT DOCUMENTS

| | | | |
|---|---|---|---|
| 2006/0074784 A1* | 4/2006 | Brown | 705/35 |
| 2006/0224480 A1 | 10/2006 | Bent et al. | |
| 2007/0080207 A1* | 4/2007 | Williams | 235/379 |
| 2007/0136162 A1 | 6/2007 | Thibodeau | |
| 2007/0198403 A1 | 8/2007 | Aloni et al. | |
| 2007/0226131 A1* | 9/2007 | Decker et al. | 705/38 |
| 2008/0052226 A1 | 2/2008 | Agarwal et al. | |
| 2008/0140561 A1 | 6/2008 | Neel | |
| 2009/0138397 A1 | 5/2009 | Sharma | |
| 2009/0228391 A1 | 9/2009 | Sorbe et al. | |
| 2010/0153244 A1 | 6/2010 | Sharma | |

OTHER PUBLICATIONS

By Jerry Morgan, S. W. (Sep. 10, 1992). Putting plastic to the metal GM MasterCard provides rebate toward auto purchase. Newsday. Retrieved Oct. 10, 2013.*

Bongiorni, S. (1997). 'Auto card' aims to speed car loans. The Greater Baton Rouge Business Report, 16(2), 35. Retrieved Oct. 10, 2013.*

Caywood, T. (1997). First NBC baits borrowers with new 'auto card'. New Orleans CityBusiness, 18(6), 8. Retrieved Oct. 10, 2013.*

"U.S. Appl. No. 11/904,223, Non Final Office Action mailed Jun. 18, 2009", 12 pgs.

"U.S. Appl. No. 11/904,223, Non Final Office Action mailed Sep. 15, 2008", 10 pgs.

"U.S. Appl. No. 11/904,223, Response filed Mar. 13, 2009 to Non Final Office Action mailed Sep. 15, 2008", 11 pgs.

"U.S. Appl. No. 11/904,224 Non-Final Office Action mailed Aug. 6, 2010", 13 pgs.

"U.S. Appl. No. 11/904,224, Final Office Action mailed Aug. 5, 2009", 13 pgs.

"U.S. Appl. No. 11/904,224, Final Office Action mailed Mar. 10, 2011", 15 pgs.

"U.S. Appl. No. 11/904,224, Non Final Office Action mailed Jan. 12, 2009", 11 pgs.

"U.S. Appl. No. 11/904,224, Non Final Office Action mailed Sep. 15, 2008", 11 pgs.

"U.S. Appl. No. 11/904,224, Non-Final Office Action mailed Jan. 29, 2010", 12 pgs.

"U.S. Appl. No. 11/904,224, Response filed Jan. 6, 2011 to Non Final Office Action mailed Aug. 6, 2010", 10 pgs.

"U.S. Appl. No. 11/904,224, Response filed May 12, 2009 to Non Final Office Action mailed Jan. 12, 2009", 18 pgs.

"U.S. Appl. No. 11/904,224, Response filed Jun. 29, 2010 to Non Final Office Action mailed Jan. 29, 2010", 10 pgs.

"U.S. Appl. No. 11/904,224, Response filed Nov. 13, 2008 to Non-Final Office Action mailed Sep. 15, 2008", 14 pgs.

"U.S. Appl. No. 11/904,224, Response filed Dec. 7, 2009 to Final Office Action mailed Aug. 5, 2009", 12 pgs.

"U.S. Appl. No. 11/904,243 Final Office Action mailed Jul. 21, 2010", 10 pgs.

"U.S. Appl. No. 11/904,243, Non Final Office Action mailed Mar. 28, 2011", 11 pgs.

"U.S. Appl. No. 11/904,243, Non Final Office Action mailed Jun. 19, 2009", 10 pgs.

"U.S. Appl. No. 11/904,243, Non Final Office Action mailed Sep. 15, 2008", 9 pgs.

"U.S. Appl. No. 11/904,243, Non Final Office Action mailed Sep. 15, 2011", 11 pgs.

"U.S. Appl. No. 11/904,243, Non-Final Office Action mailed Mar. 10, 2010", 9 pgs.

"U.S. Appl. No. 11/904,243, Response filed Mar. 13, 2009 to Non Final Office Action mailed Sep. 15, 2008", 10 pgs.

"U.S. Appl. No. 11/904,243, Response filed Jun. 10, 2010 to Non Final Office Action mailed Mar. 10, 2010", 11 pgs.

"U.S. Appl. No. 11/904,243, Response filed Jun. 28, 2011 to Non Final Office Action mailed Mar. 28, 2011", 11 pgs.

"U.S. Appl. No. 11/904,243, Response filed Nov. 19, 2009 to Non Final Office Action mailed Jun. 19, 2009", 11 pgs.

"U.S. Appl. No. 11/904,243, Response filed Dec. 21, 2010 to Final Office Action mailed Jul. 21, 2010", 10 pgs.

"U.S. Appl. No. 11/904,276, Appeal Brief filed Jul. 15, 2011", 22 pgs.

"U.S. Appl. No. 11/904,276, Decision on Pre-Appeal Brief mailed Jun. 15, 2011", 2 pgs.

"U.S. Appl. No. 11/904,276, Examiners Answer to Appeal Brief mailed Aug. 23, 2011", 11 pgs.

"U.S. Appl. No. 11/904,276, Final Office Action mailed Mar. 11, 2010", 12 pgs.

"U.S. Appl. No. 11/904,276, Final Office Action mailed Jan. 11, 2011", 13 pgs.

"U.S. Appl. No. 11/904,276, Non Final Office Action mailed Jun. 18, 2009", 13 pgs.

"U.S. Appl. No. 11/904,276, Non Final Office Action mailed Dec. 9, 2008", 10 pgs.

"U.S. Appl. No. 11/904,276, Non-Final Office Action mailed Aug. 10, 2010", 11 pgs.

"U.S. Appl. No. 11/904,276, Pre-Appeal Brief Request mailed May 11, 2011", 4 pgs.

"U.S. Appl. No. 11/904,276, Response filed Mar. 6, 2009 to Non Final Office Action mailed Dec. 9, 2008", 11 pgs.

"U.S. Appl. No. 11/904,276, Response filed Jun. 11, 2010 to Final Office Action mailed Mar. 11, 2010", 10 pgs.

"U.S. Appl. No. 11/904,276, Response filed Jan. 10, 2010 to Non Final Office Action mailed Aug. 10, 2010", 9 pgs.

"U.S. Appl. No. 11/904,276, Response filed Nov. 18, 2009 to Non Final Office Action mailed Jun. 18, 2009", 12 pgs.

"U.S. Appl. No. 12/211,184, Examiner Interview Summary mailed May 10, 2011", 3 pgs.

"U.S. Appl. No. 12/211,184, Final Office Action mailed Feb. 4, 2011", 9 pgs.

"U.S. Appl. No. 12/211,184, Non Final Office Action mailed Aug. 30, 2011", 14 pgs.

"U.S. Appl. No. 12/211,184, Non-Final Office Action mailed Jul. 8, 2010", 11 pgs.

"U.S. Appl. No. 12/211,184, Response filed May 4, 2011 to Final Office Action mailed Feb. 4, 2011", 9 pgs.

"U.S. Appl. No. 12/211,184, Response filed Nov. 8, 2010 to Non Final Office Action mailed Jul. 8, 2010", 9 pgs.

"U.S. Appl. No. 12/211,189, Appeal Brief filed Sep. 12, 2012 to", 9 pgs.

"U.S. Appl. No. 12/211,189, Decision on Pre-Appeal Brief mailed Jul. 31, 2012", 2 pgs.

"U.S. Appl. No. 12/211,189, Final Office Action mailed Apr. 12, 2012", 16 pgs.

"U.S. Appl. No. 12/211,189, Final Office Action mailed Dec. 28, 2009", 10 pgs.

"U.S. Appl. No. 12/211,189, Non Final Office Action mailed Apr. 28, 2009", 9 pgs.

"U.S. Appl. No. 12/211,189, Non Final Office Action mailed Nov. 2, 2011", 18 pgs.

"U.S. Appl. No. 12/211,189, Pre-Appeal Brief Request filed Jul. 12, 2012", 4 pgs.

"U.S. Appl. No. 12/211,189, Response filed Feb. 2, 2012 to Non Final Office Action mailed Nov. 2, 2011", 10 pgs.

"U.S. Appl. No. 12/211,189, Response filed Mar. 29, 2010 to Final Office Action mailed Dec. 28, 2009", 9 pgs.

"U.S. Appl. No. 12/211,189, Response filed Aug. 28, 2009 to Non Final Office Action mailed Apr. 28, 2009", 12 pgs.

"U.S. Appl. No. 12/211,195, Non Final Office Action mailed Jul. 5, 2011", 9 pgs.

"Lowe's Launches New Project Card", PR Newswire, New York, (Mar. 7, 2006), 3 pgs.

"On Time (R) Prepaid Visa (R) Card Program, Dealer Quick Help Guide for Sekurus Loan Placement Program", [Online]. Retrieved from the Internet: <URL: www.mycarpayment.com/form-downloads/DealerQuickHelp.pdf>, (Jul. 13, 2008), 3 pgs.

"Unsecured Loans for Any Purpose with an In Principle Decision on Your Unsecured Loan within 15 Minutes", [Online]. Retrieved from the Internet: <URL: www.creditsolutions4all.co.uk>, (Jul. 13, 2008), 4 pgs.

* cited by examiner

SYSTEMS AND METHODS FOR FUNDING AND BINDING AUTO LOANS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2007.

CROSS-REFERENCE TO RELATED APPLICATIONS

This application is related by subject matter to the subject matter disclosed in the following commonly assigned applications, the entirety of which are incorporated by reference herein: U.S. patent application Ser. No. 11/904,243, U.S. patent application Ser. No. 11/904,276, U.S. patent application Ser. No. 11/904,224, U.S. patent application Ser. No. 11/904,223, each filed on Sep. 25, 2007 and each entitled "Systems and Methods for Funding and Binding Auto Loans."

BACKGROUND

A traditional method of shopping for a product that may require a loan, such as a house or vehicle, involved the car buyer selecting the product and applying for a loan through the merchant supplying the product such as, for example, a car dealership. The car dealership would access the loan department for several banks and apply for the loan using information provided for by the car buyer. Upon receipt of an approval by the bank for a loan, the car dealership would present the loan terms to the car buyer, and upon approval by the car buyer, the card dealership would submit the necessary paperwork to complete the loan processing.

Because of an increased access to banks, car buyers are increasingly shopping multiple banks for automobile loans prior to, or in conjunction with, shopping for their automobile. The car buyer, upon review by the bank of an application for the loan, will be presented with loan terms. If the car buyer applies at several banks, the car buyer can compare offers and select the offer that best fits their expectations or needs. The car buyer may therefore secure financing for the automobile loan in a manner independent from the dealership in which the purchase is to be made.

To facilitate the transaction, once a bank approves an application for a loan and the applicant accepts the loan, the bank may send the applicant a site draft or a certified bank check. A site draft is essentially a check issued by the bank for a specific purpose, that is, to purchase an automobile. After receiving the site draft, when the buyer selects a car for purchase and finalizes the purchase price with the dealership, the car buyer fills in relevant information on the site draft and hands the site draft over to the dealership as payment for the car.

Unfortunately, site drafts or certified bank checks may not be readily acceptable to the merchant supplying the product such as the car dealership. For example, car dealerships may be hesitant to accept a site draft because of a perceived extended time for the site draft or certified check to clear, thus dealing the time in which the loan funds are deposited into the car dealership's bank account. To try to avoid that delay and receive their money sooner, car dealerships may attempt to steer or offer the car buyer into a loan provided by one of the banks associated with the car dealership. Additionally, because the site draft or certified check is a paper document, the same or similar fraud issues with transporting checks, both through the postal system and while shopping for a car, may also apply to a site draft. The site draft may be stolen and used in a fraudulent transaction. Additionally, the site draft may be used by the applicant for an unauthorized purpose.

SUMMARY

Systems, methods and computer-readable media are provided for purchasing a product, such as a house or vehicle, through the use of an inactive financial product that is activated when a buyer of the product and product information is transmitted to a bank that approved a loan. Upon verification that the information transmitted is authentic, the inactive financial product, such as a debit or credit card as well as a bank account, may be activated for use. Although the following description uses the purchase of a vehicle for exemplary purposes, the subject matter is not limited to a vehicular purchase. Additionally, when describing a vehicle, a vehicle may be an automobile, a boat, a recreational vehicle, or a motorcycle.

In one exemplary and non-limiting embodiment a way of providing funds for the purchase of a vehicle comprises approving a loan application, opening a financial account having an amount of funds corresponding to an approved amount of the loan, wherein the financial account is initially configured to be inactive, wherein the financial account is further configured to change to an active account upon receipt and verification of a vehicle identification number, receiving a notice that the applicant wishes to purchase a vehicle, wherein the notice comprises a vehicle identification number for the vehicle, reconfiguring the account to be an active account if the received vehicle identification number is verified, and disbursing at least a portion of the funds in the financial account.

In another exemplary and non-limiting embodiment, a way to for a financial institution to provide an automobile loan comprises approving an application from a car buyer for an automobile loan, wherein the application comprises identification information of the car buyer, sending an inactivated loan card to the car buyer, wherein the loan card is associated with a financial account, wherein the financial account is established by the financial institution, receiving automobile information, and activating the loan card.

In another exemplary and non-limiting embodiment, a way for a financial institution to facilitate the purchase of an automobile by an applicant of a loan comprises opening a financial account upon approval of an application for the loan, depositing an amount of money into the financial account, wherein the amount of money deposited is based upon the amount of the loan, issuing an inactive loan card to the applicant, wherein the loan card is associated with the financial account, receiving a request to activate the loan card, wherein the request comprises vehicle identification information and information related to a buyer of the automobile, and activating the loan card upon verifying the authenticity of the vehicle identification information and verifying that the information related to the buyer corresponds to the applicant of the loan.

In a still further and non-limiting embodiment a way to purchase an automobile comprises sending a loan application for a purchase of an automobile to a financial institution, wherein the loan application comprises identification information relating to an applicant for the loan and a loan amount, receiving notification that the financial institution has approved the loan application, receiving a loan card, wherein the loan card is configured for use in a transaction involving the automobile, wherein the loan card is inactive, after selecting the automobile to be purchased, transmitting information relating to a buyer of the automobile and of the car buyer to the financial institution, receiving notification that the loan card has been activated, and purchasing the selected automobile using the loan card.

In an additional non-limiting embodiment a for a financial institution to provide an automobile loan comprises approving an application from a car buyer for an automobile loan, wherein the application comprises identification information of the car buyer, opening a financial account associated with the loan if the loan application is approved, wherein the financial account is configured to be inactive, sending information related to the loan to the applicant of the loan, wherein the information related to the loan comprises an approved amount of the loan and a number associated with the financial account associated with the loan, receiving a notification that the applicant for the loan has agreed to purchase an automobile using the loan, wherein the notification comprises identification information of the applicant and information related to the identification of the automobile, reconfiguring the financial account if the identification information of the applicant and the information related to the identification of the automobile are verified, and sending a notice that the financial account has been activated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION

Certain details are set forth in the following description and figures to provide a thorough understanding of various embodiments of the subject matter. Certain well-known details often associated with computing and software technology are not set forth in the following disclosure to avoid unnecessarily obscuring the various embodiments of the subject matter. Further, those of ordinary skill in the relevant art will understand that they can practice other embodiments of the subject matter without one or more of the details described below. Finally, while various methods are described with reference to steps and sequences in the following disclosure, the description as such is for providing a clear implementation of embodiments of the subject matter, and the steps and sequences of steps should not be taken as required to practice this subject matter.

Figure 1:
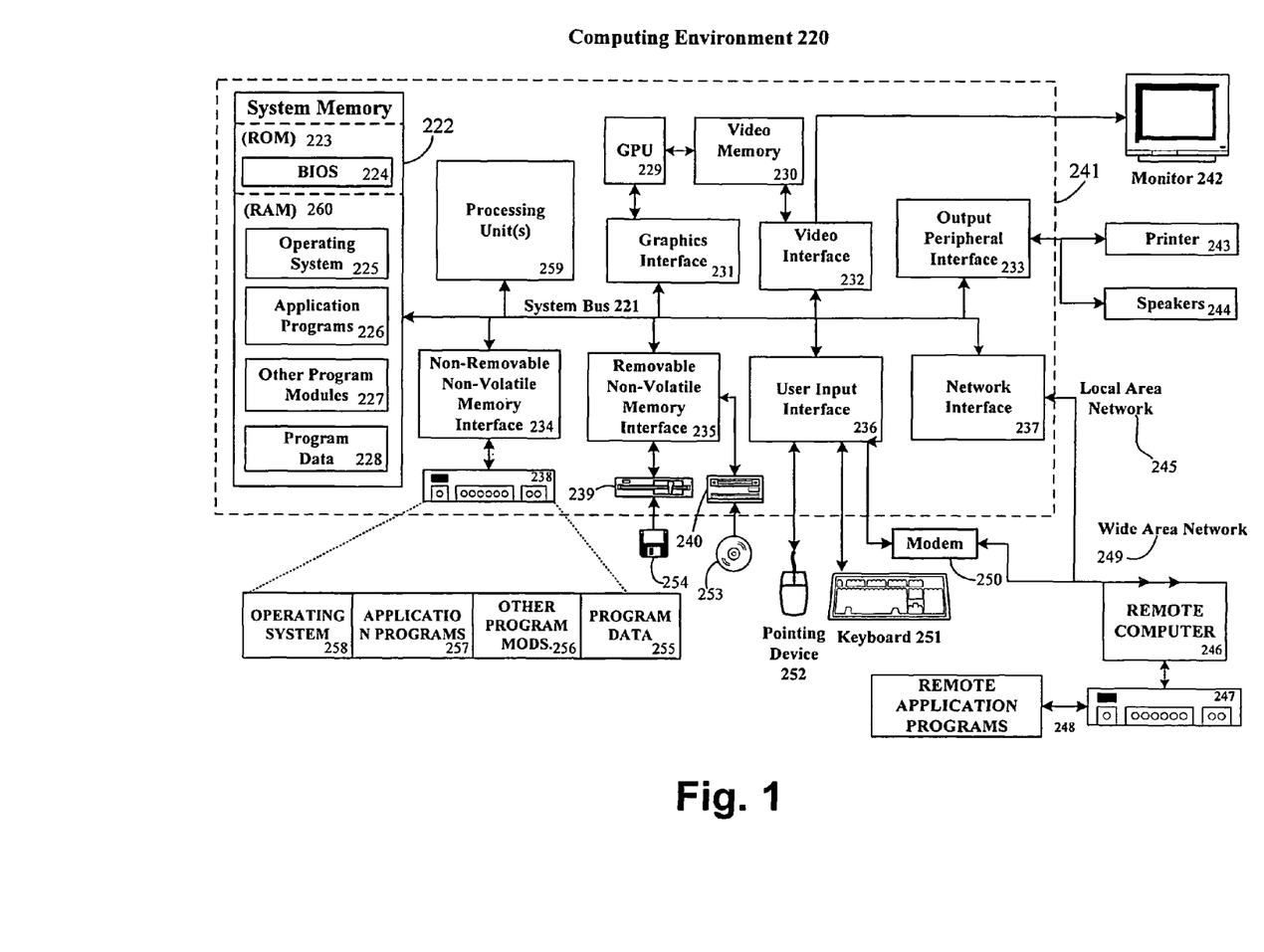
FIG. 1 is a block diagram representing an exemplary and non-limiting computing device suitable for use in conjunction with providing a way to fund an automobile loan with the use of a loan card.

Referring to FIG. 1, shown is a block diagram representing an exemplary computing environment suitable for use in conjunction with implementing the processes described below. For example, the computer executable instructions that carry out the processes and methods for providing a method to fund an automobile loan may reside and/or be executed in such a computing environment as shown in FIG. 1. The computing environment 220 is only one example of a suitable computing environment and is not intended to suggest any limitation as to the scope of use or functionality of the subject matter. Neither should the computing environment 220 be interpreted as having any dependency or requirement relating to any one or combination of components illustrated in the computing environment 220. For example, a computer game console may also include those items such as those described below for use in conjunction with implementing the processes described above.

Aspects of the subject matter are operational with numerous other general purpose or special purpose computing system environments or configurations. Examples of well known computing systems, environments, and/or configurations that may be suitable for use with the subject matter include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the subject matter may be implemented in the general context of computer-executable instructions, such as program modules, being executed by a computer. Generally, program modules include routines, programs, objects, components, data structures, etc. that perform particular tasks or implement particular abstract data types. Aspects of the subject matter may also be practiced in distributed computing environments where tasks are performed by remote processing devices that are linked through a communications network. In a distributed computing environment, program modules may be located in both local and remote computer storage media, including memory storage devices.

An exemplary system for implementing aspects of the subject matter includes a general purpose computing device in the form of a computer 241. Components of computer 241 may include, but are not limited to, a processing unit 259, a system memory 222, and a system bus 221 that couples various system components, including the system memory 222 to the processing unit 259. The system bus 221 may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 241 typically includes a variety of computer-readable media. Computer-readable media can be any available media that can be accessed by computer 241 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electrically erasable programmable read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A BIOS 224 (basic input/output system), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example, FIG. 1 illustrates a hard disk drive 238 that reads from or writes to non-removable, non-volatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media, discussed above and illustrated in FIG. 1, provide storage of computer-readable instructions, data structures, program modules, and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball, or touch pad. Other input devices (not shown) may include a microphone, joystick, game pad, satellite dish, scanner, or the like. These and other input devices are often connected to the processing unit(s) 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface 237. When used in a WAN networking environment, the computer 241 typically includes a modem 250 or other means for establishing communications over the WAN 249, such as the Internet. The modem 250, which may be internal or external, may be connected to the system bus 221 via the user input interface 236 or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the subject matter in the context of one or more stand-alone computer systems, the subject matter is not so limited, but rather may be implemented in connection with any computing environment, such as a network or distributed computing environment. Still further, aspects of the subject matter may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the subject matter should not be limited to any single embodiment, but rather should be construed in breadth and scope in accordance with the appended claims.

Figure 2:
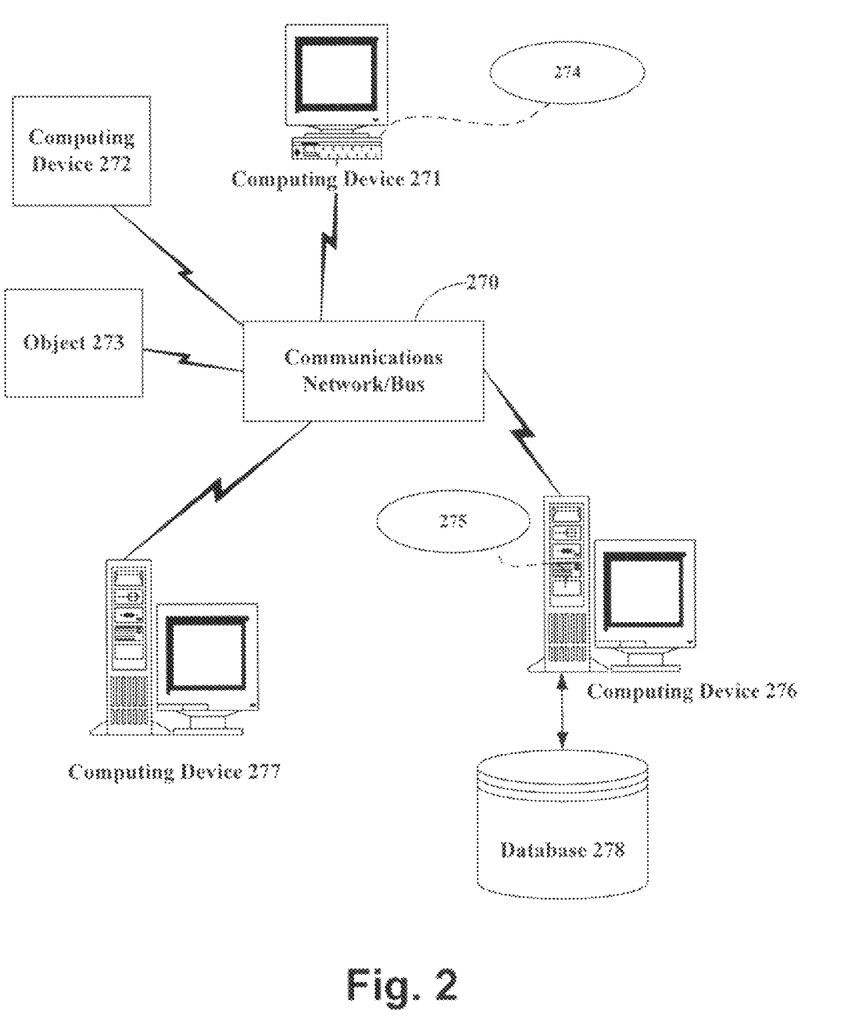
FIG. 2 illustrates an exemplary and non-limiting networked computing environment in which many computerized processes may be implemented to provide a way to fund an automobile loan with the use of a loan card.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing the processes for implementing a competitive online quotes web service. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as personal data assistants (PDAs), audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network/bus 270. In this regard, any entity may be responsible for the maintenance and updating of a database 278 or other storage element.

This communications network/bus 270 may itself comprise other computing entities that provide services to the system of FIG. 2, and may itself represent multiple interconnected networks. In accordance with an aspect of the subject matter, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., and software objects such as interfaces, COM objects, and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the subject matter should not be limited to any single embodiment, but rather should be construed in breadth and scope in accordance with the appended claims.

In the present subject matter, when the car buyer is approved for a loan, the bank may send an inactive card associated with a credit account up to the amount of the loan. The bank may also send other types of financial instruments, such as a debit card associated with a debit card account. In the case of the credit or debit card, when the car buyer receives the card, the car buyer should not be able to use the card for any transaction because the card is inactive. Thus, if the card was stolen, the likelihood that the card will be used for fraudulent means is reduced.

In order to activate the card for use in a transaction, the bank may require that the user transmit certain information. For example, the information may be a car vehicle identification number along with the identification information of the car buyer. A vehicle identification number (VIN) is a unique number assigned to most automobiles sold in the marketplace today. Each VIN is unique, i.e. theoretically, no two cars sold in the modern era, starting from around the 1980's, have the same YIN. When an automobile manufacturer assigns a VIN to a specific automobile, information about the automobile, including make, model, options installed, etc., may be stored in a central database. Additionally, because of the advent of the internet, the car's history, linked to the VIN, may also be stored in the database. Thus, when the VIN database, which may consist of one or more databases, is accessed, information about the car may be retrieved.

Figure 3:
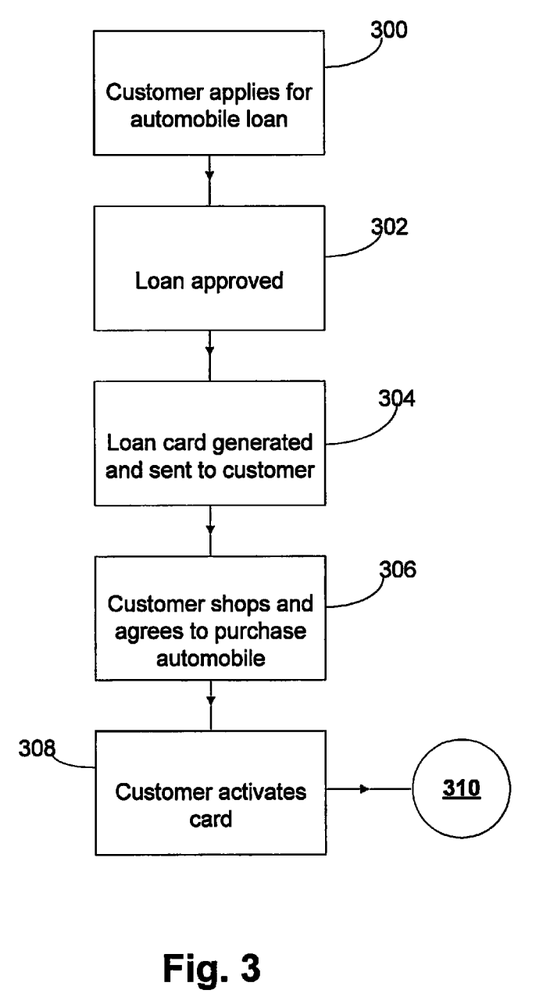
FIG. 3 is an exemplary and non-limiting diagram illustrating a way to fund an automobile loan with the use of a loan card.

Because the loan may be for a specific purchase type, i.e. to buy a car, a bank may use the VIN to activate the card. When a bank receives identification information that corresponds to the person that applied for the loan and a VIN of a car the buyer wishes to purchased, if the VIN is a an authentic VIN, the card may be activated. FIG. 3 is an exemplary and non-limiting overview of a process for activating a financial product. First, the customer applies 300 for an automobile loan. After reviewing the application, the bank approves 302 the customer's loan application and opens a credit or debit card account in the amount of the loan requested. The credit or debit card may be inactive to reduce the possibility of fraud.

Once the account is opened, a loan card associated with that account may be generated and sent 304 to the customer. Once the customer receives the loan card, the customer can now shop around for an automobile with "cash in hand", i.e. a financial instrument that can be used to purchase the automobile, thus potentially giving the car buyer more flexibility and bargaining power. When the customer decides to purchase a specific car, the customer then agrees 306 to purchase the car from the dealer or individual. The customer's identification information and the VIN of the car to be bought are transmitted to the lending bank.

The YIN, and possibly the customer information, may be used to securitize the loan. Activation of the loan card makes it possible for the customer to use the loan card in a transaction to purchase the vehicle. The information used to activate the card may be sent to a customer information system, a database, either regional or national, which associates VINs with the dealership holding title. The customer information system can also cross reference police stolen vehicle report databases to ensure that the VIN does not belong to a stolen vehicle. After review, if the information is verified to be authentic, the loan card is activated 308 for use in the transaction. There may be additional conditions placed upon the use of the loan card. For example, the financial institution may establish a time frame in which the card is to be used. Additionally, the financial institution may send updated loan information if the customer does not use the loan card within a certain amount of time.

Figure 3A:
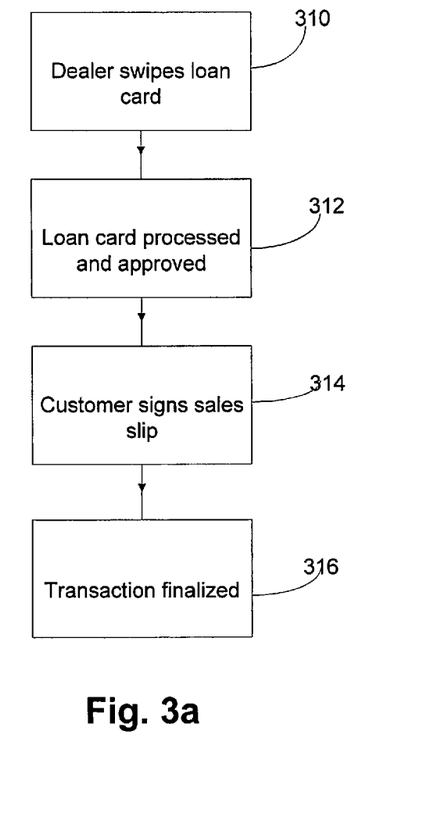
FIG. 3a is an exemplary and non-limiting diagram illustrating the use of a loan card to purchase an automobile.

At this point, the loan card functions in a similar manner to a typical credit or debit card. FIG. 3a illustrates a typical credit or debit transaction using the loan card. The dealer will "swipe" 310 the card, i.e. the dealer will run the card through a credit or debit card processing machine, to being the transaction. The card number along with the purchase amount may be transmitted to a credit card processing network for processing 312. Upon verification that the credit account or debit account is of a sufficient amount to cover the transaction, the credit card network may send an approval of the transaction to the dealer. A sales slip is printed and the customer signs 314 the sales slip to approve the transaction. A sales slip may be of various forms, but may include a receipt printed at the point of sale, which is the car dealership, that has a signature line and a transaction amount on the slip. The buyer signs the slip to indicate their intent to enter into the transaction. Once the sales slip is handed over to the dealer, the transaction may be finalized 316. The funds from the credit or debit account will be transferred to the car dealership's bank for payment, typically during a batch process run by the credit card network at night.

Figure 4:
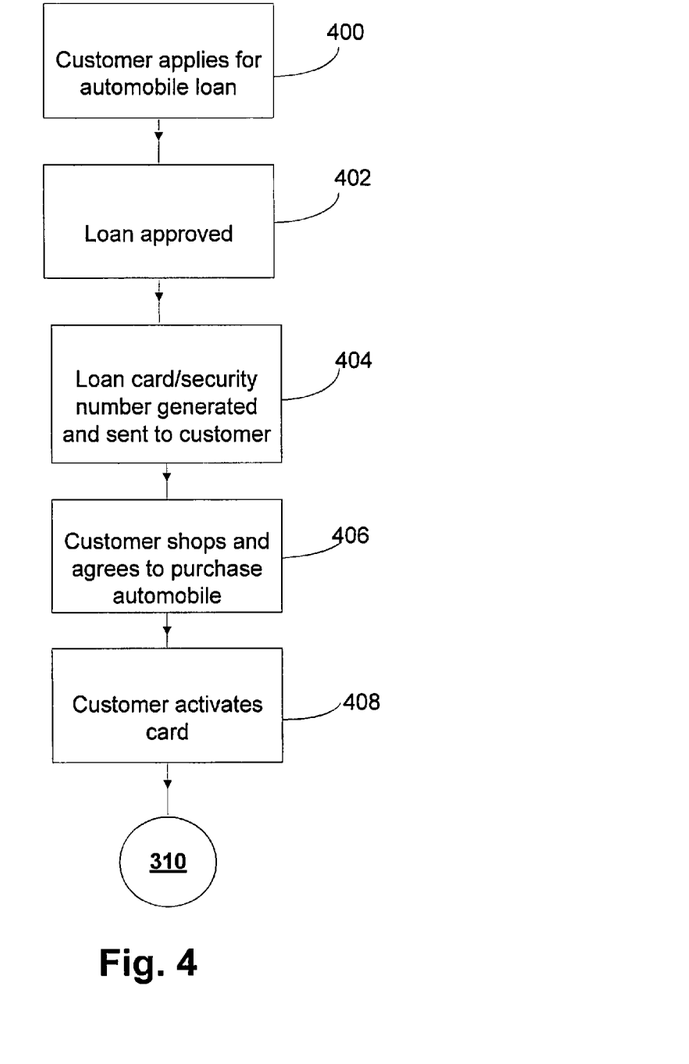
FIG. 4 is an exemplary and non-limiting diagram illustrating a way to fund an automobile loan with the use of a loan number and security code.

If the lending bank or the consumer desires or needs an additional layer of security to prevent fraud, the lending bank may require additional information to provided along with the VIN and the customer information. FIG. 4 is illustrative of an exemplary and non-limiting way to require additional information for loan card activation. The customer first applies 400 for an automobile loan. After reviewing the loan application, the lending bank may approve 402 the loan application. Then, the lending bank may open a credit or debit card account in the amount of the approved loan and send 404 a loan card associated with the credit or debit account to the customer. Additionally, to provide an added layer of security, the lending bank may also require additional security or authentication such as through the use of a security code to be used in the activation process to the customer. The security code may be any number or type of numbers, including alphanumeric characters that may be uniquely associated with the account and the loan card. In some embodiments, the security code may be any number or type of numbers, including alphanumeric characters uniquely associated with the customer and/or an account of the customer at the lending bank different than the account associated with the loan card, for example, a PIN or password used by the customer to access checking and saving accounts at the institution. Thus, in order to activate the loan card for use, in this exemplary illustration, the lending bank may need to receive customer identification information, a VIN, and the security code or number.

Once the customer shops and agrees 406 to purchase an automobile from a car dealer, the identification information of the customer, the VIN of the car to be purchased and the security code are transmitted to the lending bank to activate 408 the loan card. Although it may be easier for the car dealer to collect and transmit this information, the customer or an agent of the customer may also cause the information to be transmitted. For example, the customer may call the lending bank and enter the information, either through speaking the information or through the use of touch tone telephone technology, i.e. pressing a number on the telephone keypad to enter the number. Once the loan card is activated, the transaction may proceed in various manners, including the manner described in reference to FIG. 3*a* above.

Figure 5:
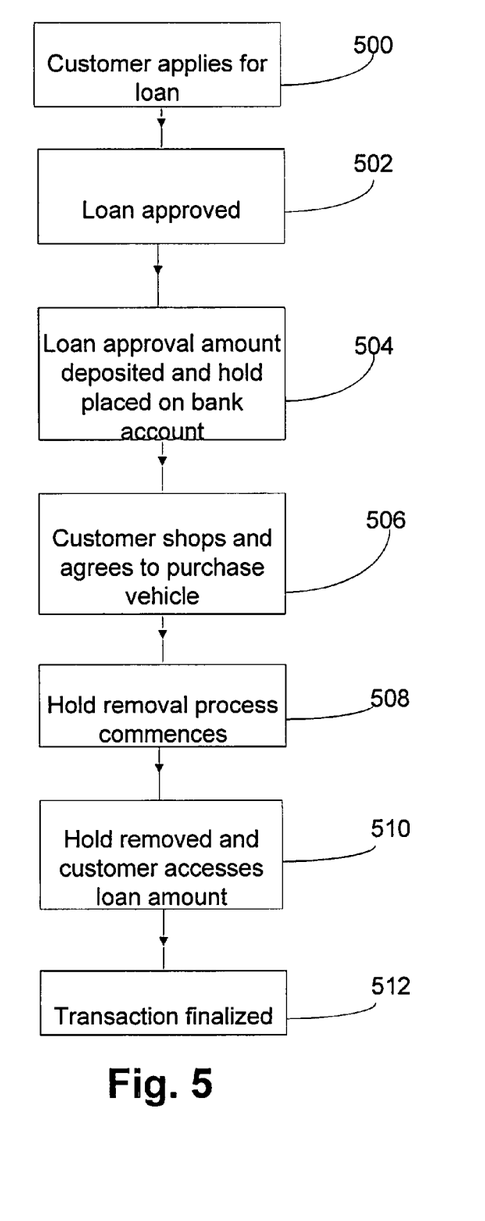
FIG. 5 is an exemplary and non-limiting diagram illustrating a manner in which a financial institution may fund an automobile loan according the present subject matter.

FIG. 5 illustrates an exemplary and non-limiting way which a lending institution may send a financial instrument associated with a debit account to the customer. A lending institution may wish to use a debit account rather than a credit account because of a possible reduction in processing the transaction and disbursing the funds to the car dealer's bank. If a debit account is opened, the bank may go ahead and deposit the loan amount in to the account.

When a transaction occurs, the money that is in the account may be transferred through the debit process to the car dealer's bank. The remaining funds are taken out of the account and the account is closed. The loan amount may be the amount that was withdrawn from the account. In the case of a credit account, to clear and close the account, the bank may have to apply money to the credit account in the amount of the credit transaction processed. To finalize the loan transaction and determine the loan amount using a credit account may take additional steps, and thus, may not be preferable for use in view of a debit account.

Thus, in FIG. 5, after the customer applies 500 and is approved 502 for an automobile loan, the lending bank may deposit 504 the loan amount into a debit account and place a hold on the account. The amount deposited may correspond to the amount of the loan. Although the bank may issue an inactivated loan card, the bank may also use the hold as the activation mechanism. In other words, even if the loan card were active, the credit card processing network or debit card processing network, which may be the same networks, once the account associated with the loan card was accessed, the network will be notified of the hold and the transaction will not be approved. In order to remove the hold, the financial institution may require information to be received, such as a vehicle identification number.

Thus in order to remove the hold, when a customer shops and agrees 506 to purchase an automobile, the hold removal process begins 508 in order to use the funds deposited into the account. The hold removal process may require that the customer or an agent of the customer transmit certain information to the customer. Because the loan may be associated with the purchase of an automobile, the financial institution may wish to verify that the loan is being used for that purpose. Thus, the financial institution may require that the VIN be transmitted to the financial institution.

Additionally, to reduce the probability of fraud, the bank may require that identification information of the buyer of the automobile be received prior to the hold being removed. The financial institution may compare the buyer information with the information received in the loan application to determine that the buyer is the applicant. Further, the financial institution may require additional information. For example, the financial institution may send the applicant a security code to be transmitted back to the financial institution along with the VIN and/or the buyer information. Upon confirmation of all three pieces of information, the financial institution may remove 510 the hold, thus allowing the customer, i.e. car buyer or applicant, to access the funds deposited into the account. After the loan funds are processed and disbursed, the transaction is finalized 512.

Although the loan applicant, or customer, may use traditional methods of searching for a vehicle, the customer may also search the Internet for an vehicle. In that instance, if the customer intends to search for a vehicle online, the sending of a physical card, e.g. a loan card, to the customer may not be needed, as the information used in a transaction online may be entirely electronic in nature. There may be other reasons for not sending the customer a physical card, such as an attempt to reduce fraud and to reduce the costs of using a physical card.

Figure 6:
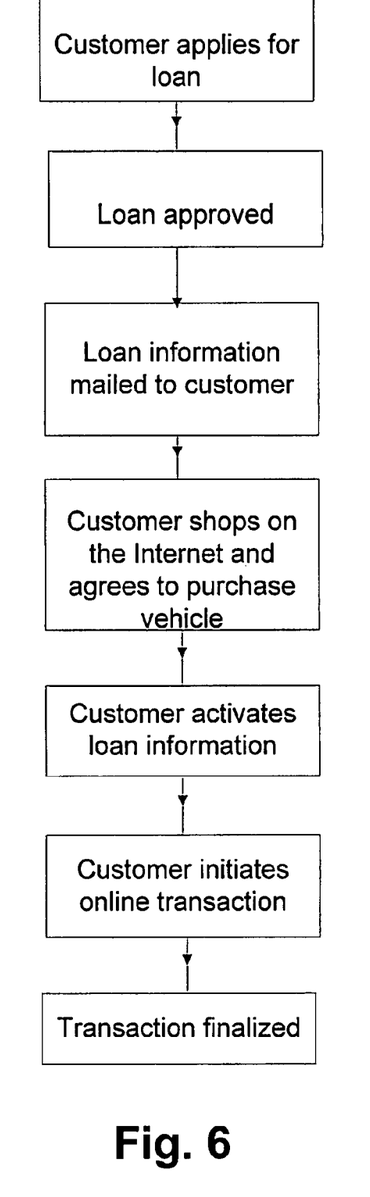
FIG. 6 is an exemplary and non-limiting diagram illustrating a way to fund an automobile loan using the Internet.

FIG. 6 illustrates a way to provide a loan by sending information to the customer, the information being associated with the use of the loan. The customer applies 600 for the loan, and upon approval 602 of the loan, loan information may be sent 604 to the customer by means of physical mail, electronic mail, fax, messaging services, for example SMS or other methods to send the loan information. The loan information may include a number of a credit or debit account associated with the loan. The loan information may also include a security code. Once the customer shops 606 for and agrees to purchase a vehicle, the customer will activate 608 the loan information by sending information required by the financial institution to activate the loan. The information may include, but is not limited to, a vehicle identification number and identification information relating to the customer. Once the customer activates the loan, the customer initiates 610 the online transaction by using the loan information provided upon approval of the loan. For example, the customer may use the numbers received in a manner similar to entering the numbers from a credit or debit card. After processing, the transaction is finalized 612.

Figure 7:
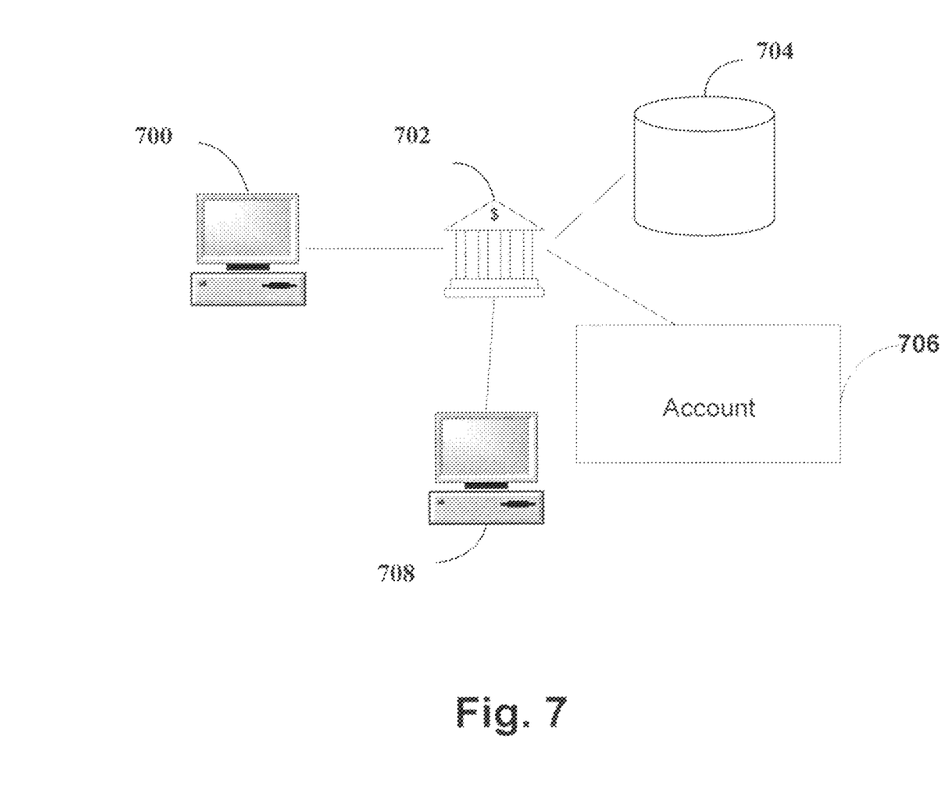
FIG. 7 is an exemplary and non-limiting diagram illustrating a system for an automobile loan transaction.

FIG. 7 is illustrative of an exemplary and non-limiting system that may be used to facilitate a loan transaction. A customer may use computer 700 to apply for a loan at financial institution 702. If financial institution 702 approves the loan, the terms of the loan may be transmitted to the computer 700 to be viewed by the customer. If the customer agrees with the loan terms, the customer may send a notice to financial institution 702 that the customer accepts the loan terms. When the loan application is approved, financial institution may create or open account 706 which is used to disburse the funds associated with the loan. For example, account 706 may be a debit account. Upon creation of account 706, financial institution 702 may deposit funds commensurate with the loan amount into account 706. Additionally, to provide a layer of security for the loan funds, financial institution may access database 704 to verify information received relating to a transaction. For example, the database may contain vehicle identification numbers or multiple listing service numbers. The information may be transmitted via merchant computer 708. The merchant may vary, but if the purchase is for an automobile, the merchant may be a car dealership. If the purchase is for a home, the merchant may be a real estate broker.

Figure 8:
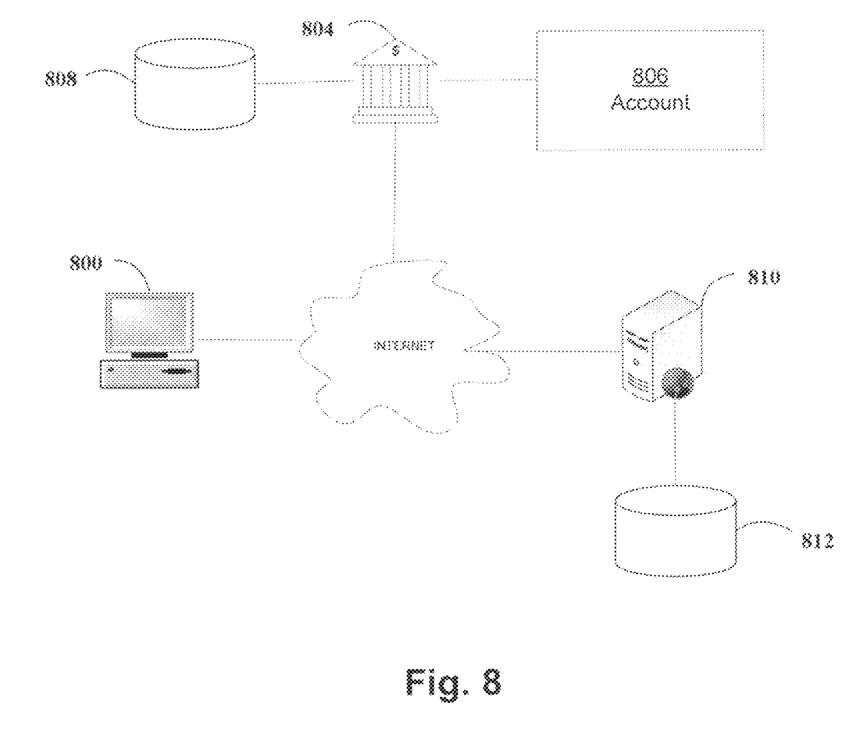
FIG. 8 is an exemplary and non-limiting diagram illustrating an online system for purchasing an automobile.

Because of the advent of online sites that allow a customer to shop for products, including vehicles and homes, the use of the Internet to purchase a product, including high value products such as homes and vehicles, is increasing. FIG. 8 is illustrative of an exemplary and non-limiting system that may be used to facilitate an online transaction. A customer uses computer 800 to apply for loan from financial institution 804 via the Internet. If financial institution 802 approves the loan, financial institution 804 may establish account 806 for use in conjunction with a transaction involving the loan. Once approved, the customer can then shop for a product, such as an automobile or a house, via the Internet by accessing website server 810, which will cause the display of an Internet website on customer computer 800.

The customer shops the Internet website. Website server 810 may have access to database 812, which contains information relating to the products searched. Once a product is selected by the customer, financial institution verifies the product information by accessing product database 808. Product database 808 may contain information supplied by a manufacturer of a product or other trusted source. Product database 808 may be used to verify the authenticity of the information retrieved from database 812. If the information is verified to be authentic, then account 806 is configured to be usable for the transaction, e.g. a hold initially placed on the account is removed or a loan card number associated with the account is activated.

The various techniques described herein may be implemented with hardware or software or, where appropriate, with a combination of both. Thus, the methods and system of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an system for practicing the disclosed embodiments. In the case of program code execution on programmable computers, the computer will generally include a processor, a storage medium readable by the processor (including volatile and non-volatile memory and/or storage elements), at least one input device, and at least one output device. One or more programs are implemented in a high-level procedural or object-oriented programming language to communicate with a computer system. However, the program (s) can be implemented in assembly or machine language, if desired. In any case, the language may be a compiled or interpreted language and combined with hardware implementations.

The described methods and system may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder, or the like, the machine becomes an system for practicing the present disclosure. When implemented on a general-purpose processor, the program code combines with the processor to provide a unique system that operates to perform the processing of the disclosed embodiments.

While the embodiments have been described in connection with the preferred embodiments of the various figures, it is to be understood that other similar embodiments may be used or modifications and additions may be made to the described embodiment for performing the same function without deviating there from. Therefore, the disclosed embodiments should not be limited to any single embodiment but rather should be construed in breadth and scope in accordance with the appended claims.

What is claimed is:

1. A method of providing funds for a purchase of a product, comprising:
   approving a loan application from an applicant by a computer system, the loan application having an approved amount of funds therefor;
   opening a financial account;
   depositing into the financial account the amount of funds corresponding to the approved amount of the loan by the computer system;
   issuing an inactive loan card to the applicant, wherein the loan card is associated with the approved amount of funds in the financial account, and wherein the loan card is initially configured to be inactive, and to change the loan card to an active card upon receipt and verification of an identification information associated with a product intended to be purchased with the amount of funds of the loan application; wherein the product is a vehicle, wherein the identification information associated with the product comprises a vehicle identification number;
   receiving a notice that the applicant wishes to purchase the product by the computer system, wherein the notice comprises the identification information associated with the product;
   reconfiguring the loan card to be an active card when the received identification information is verified by the computer system;
   receiving notification from a credit card processing network that a merchant has commenced a transaction using the loan card to purchase the product; and
   disbursing at least a portion of the approved amount funds in the loan in the financial account by the computer system to the merchant.

2. The method of claim 1, wherein the loan application comprises identification information relating to an applicant of the loan.

3. The method of claim 1, wherein receiving a notice that the applicant wishes to purchase a vehicle further comprises receiving identification information relating to a buyer of the vehicle.

4. The method of claim 1, wherein the product comprises a home, wherein the identification information associated with the product comprises an address or a multiple listing service number.

5. A system of providing funds for a purchase of a product, the system comprising:
   at least one computer device;
   at least one subsystem that approves a loan application from an applicant, the loan application having an approved amount of funds therefor;
   at least one subsystem that opens a financial account;
   at least one subsystem that deposits into the financial account the amount of funds corresponding to the approved amount of the loan;
   at least one subsystem that issues an inactive loan card to the applicant, wherein the loan card is associated with the approved amount of funds in the financial account, and wherein the loan card is initially configured to be inactive, and to change the loan card to an active card upon receipt and verification of an identification information associated with a product intended to be purchased with the amount of funds of the loan application; wherein the product is a vehicle, wherein the identification information associated with the product comprises a vehicle identification number;
   at least one subsystem that receives a notice that the applicant wishes to purchase the product, wherein the notice comprises the identification information associated with the product;
   at least one subsystem that reconfigures the card to be an active card when the received identification information is verified;

at least one system that receives notification from a credit card processing network that a merchant has commenced a transaction using the loan card to purchase the product; and at least one subsystem that disburses at least a portion of the approved amount funds in the loan in the financial account to the merchant.

6. The system of claim 5, wherein the loan application comprises identification information relating to an applicant of the loan.

7. The system of claim 5, further comprising at least one subsystem that receives identification information relating to a buyer of the vehicle.

8. The system of claim 5, wherein the product comprises a home, wherein the identification information associated with the product comprises an address or a multiple listing service number.

9. A non-transitory computer-readable medium comprising computer-readable instructions for providing funds for a purchase of a product, the computer-readable instructions comprising instructions to:

approve a loan application from an applicant, the loan application having an approved amount of funds therefor;

open a financial account;

deposit into the financial account the amount of funds corresponding to the approved amount of the loan;

issue an inactive loan card to the applicant, wherein the loan card is associated with the approved amount of funds in the financial account, and, wherein the loan card is initially configured to be inactive, and change the loan card to an active card upon receipt and verification of an identification information associated with a product intended to be purchased when the amount of funds of the loan application; wherein the product is a vehicle, wherein the identification information associated with the product comprises a vehicle identification number;

receive a notice that the applicant wishes to purchase the product, wherein the notice comprises the identification information associated with the product;

reconfigure the loan card to be an active card when the received identification information is verified;

receive notification from a credit card processing network that a merchant has commenced a transaction using the loan card to purchase the product; and disburse at least a portion of the approved amount of funds in the loan in the financial account to the merchant.

10. The computer-readable medium of claim 9, wherein the loan application comprises identification information relating to an applicant of the loan.

11. The computer-readable medium of claim 9, wherein the instructions to receive a notice that the applicant wishes to purchase a vehicle further comprises instructions to receive identification information relating to a buyer of the vehicle.

12. The computer-readable medium of claim 9, wherein the product comprises a home, wherein the identification information associated with the product comprises an address or a multiple listing service number.

\* \* \* \* \*